A. SWINTI.
LOCK.
APPLICATION FILED JAN. 21, 1921.
1,390,841.
Patented Sept. 13, 1921.
2 SHEETS—SHEET 1.
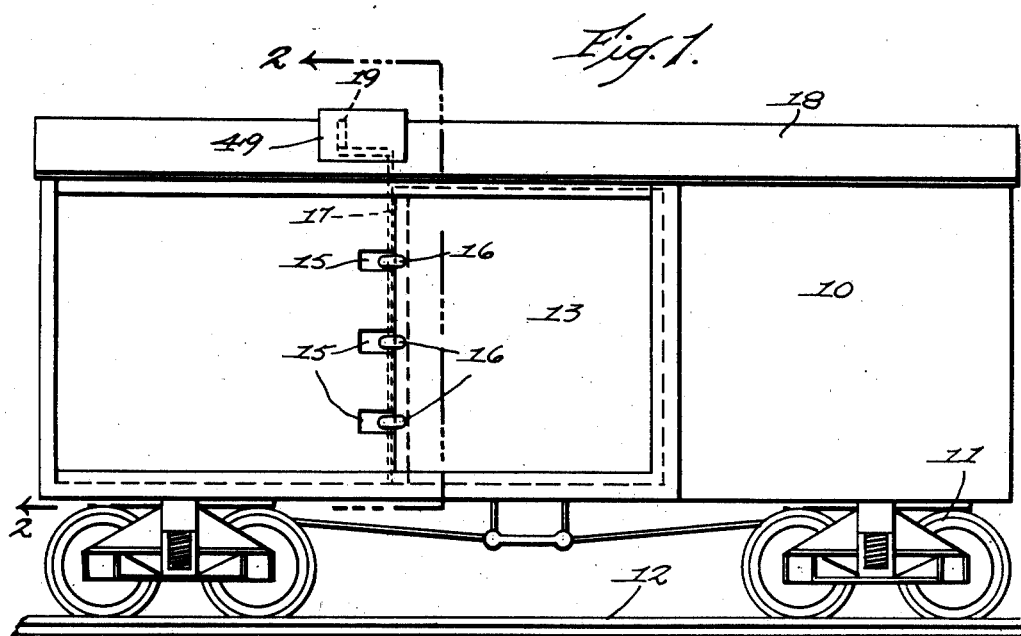
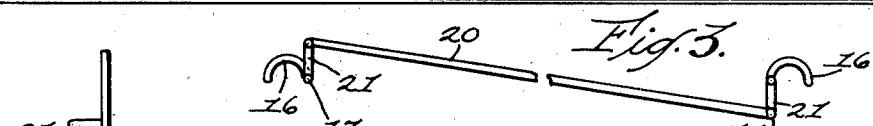
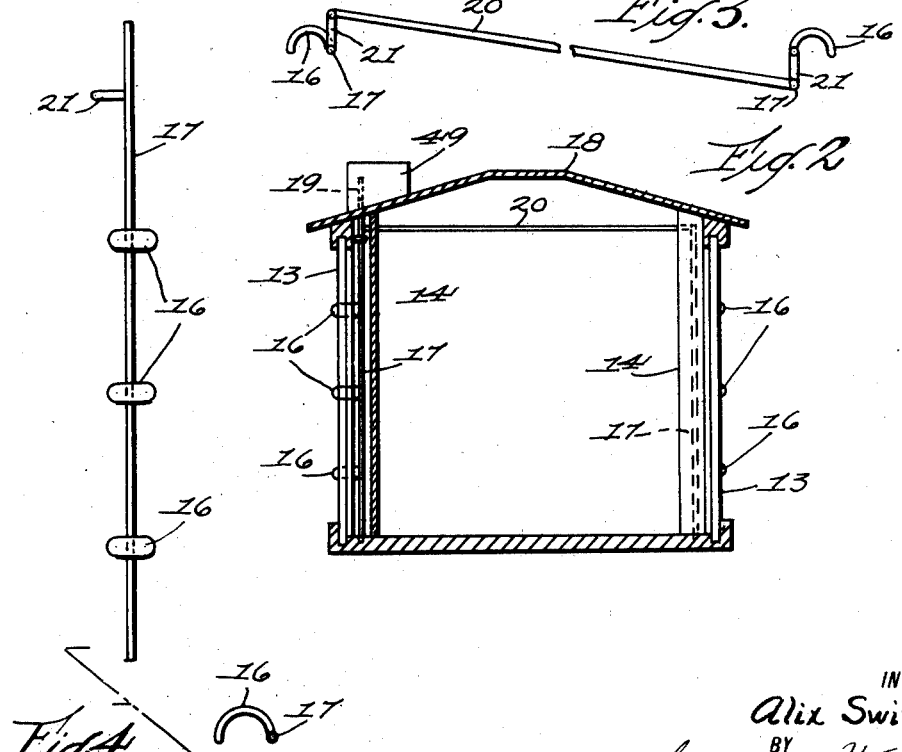
INVENTOR
Alix Swinti
BY
George C. Heinick
ATTORNEY A. SWINTI.
LOCK.
APPLICATION FILED JAN. 21, 1921.
1,390,841.
Patented Sept. 13, 1921.
2 SHEETS—SHEET 2.
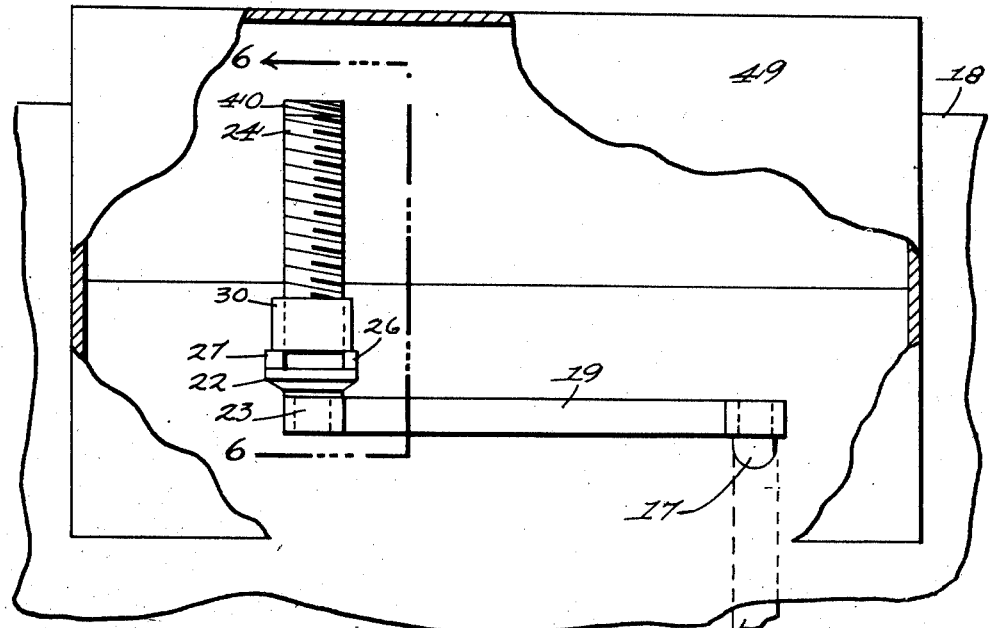
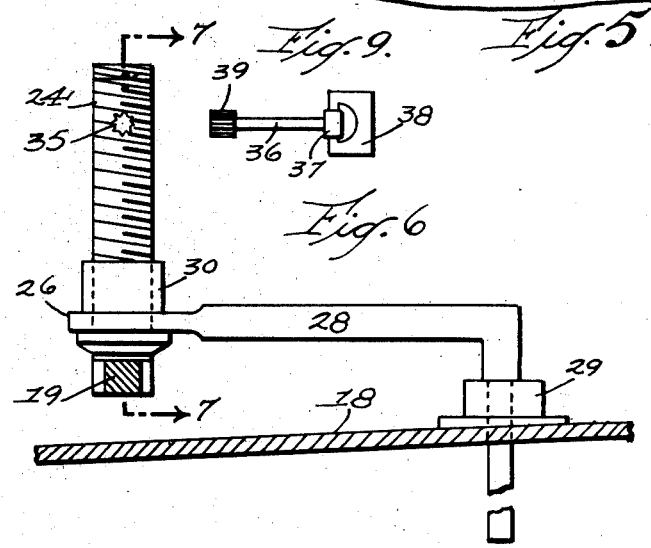
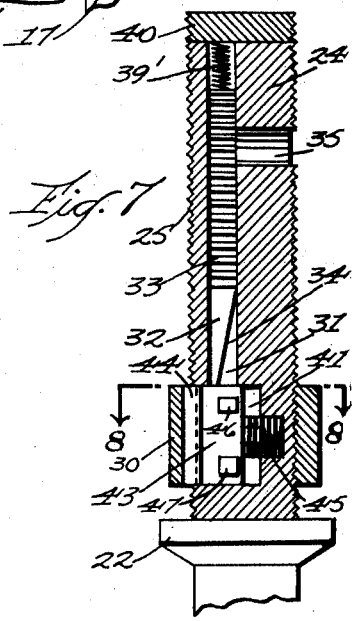
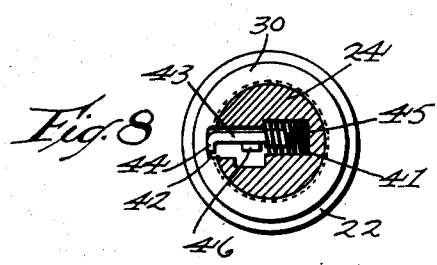
INVENTOR
Alix Swinti
BY
George E. Heinitze,
ATTORNEY

UNITED STATES PATENT OFFICE.

ALIX SWINTI, OF DETROIT, MICHIGAN, ASSIGNOR OF ONE-HALF TO JOSEPH MORANIC AND MIKE ZLOTOROWICZ, BOTH OF DETROIT, MICHIGAN.

LOCK.

1,390,841.  Specification of Letters Patent.  Patented Sept. 13, 1921.

Application filed January 21, 1921. Serial No. 438,819.

*To all whom it may concern:*

Be it known that I, ALIX SWINTI, a citizen of Poland, residing at Detroit, county of Wayne, and State of Michigan, have invented certain new and useful Improvements in Locks, of which the following is a specification.

This invention relates to improvements in locks, particularly in locks for the doors of freight or the like, and it is the principal object of the invention to provide a lock which allows an operation of the doors of a car from the roof only, or visible to a crew of a train at all times, and for quite a distance.

It is a frequent occurrence that doors of freight cars which can be locked and unlocked from the sides are opened by unauthorized parties on one side while the attention of the crew of a train was directed to the other side, and that the cars are robbed of valuable goods as silks, etc.

It is the object of the invention to overcome this disadvantage by providing a device which allows an operation of the locking mechanism of both car doors by unauthorized persons only and within sight of everybody.

These and other objects and advantages of the invention will become more fully apparent as the description proceeds and by inspection of the accompanying drawings forming a material part of the present disclosure, in which—

Figure 1 is a side view of a freight car equipped with a locking device constructed according to the present invention.

Fig. 2 is a cross-section through the same along line 2—2 of Fig. 1.

Fig. 3 shows in detail view an element for operating both doors of a car simultaneously.

Fig. 4 is a detail view of a locking bar.

Fig. 5 is a front view of a locking member and its coöperating parts on the roof of a freight car.

Fig. 6 is a side view thereof, looking along line 6—6 of Fig 5.

Fig. 7 is a section through the locking member taken along line 7—7 of Fig. 6.

Fig. 8 is a cross-section through the member taken along line 8—8 of Fig. 7, and Fig. 9 is a detail view of a key used to operate the lock.

A freight car, so-called box-car, 10 running with its wheels 11 on rails 12 is provided with the customary sliding side door 13 on the usual, well known runways. A partition 14 is provided in the car near the end of the door opening and the wall of the car is provided at this place with recesses 15 through which curved fingers 16 grip over the outer edge of the car door to hold the same in closed position. The inner ends of these fingers are secured to a vertical rod or bar 17 vertically and rotatably secured in the car within the space formed by the partition 14 and the car wall; the upper end of this bar 17 is extended above the car roof 18 and provided with a crank handle 19. Two of such bars 17 are provided for each car, one on each side thereof, and the two bars of one car are connected at their upper ends by an operating rod 20 located on the inside of the car.

A socket 22 is secured to the upper end of the handle 19 as at 23 Fig. 5, and a body 24 with outer screw thread 25 is mounted in said socket and provided near its lower end with a recessed part in which the end 26 and 27 of a forked bar 28 grip around the body 24, while the outer end of the fork is secured in a socket 29 of the car roof 18 so that the forked bar may be raised in order to disengage its ends 26 and 27 from the body, when a sleeve 30, which normally engages the upper edges of the fork, and which is screwed upon the body 24, is lifted.

The body 24 is provided in its interior with a vertical channel 31 in which a pin 32 is sliding provided at one of its side faces with a rack 33 while its lower end is pointed as at 34. A radial channel 35 in the body 24 near the upper end thereof allows the introduction of the shank 36 of a key 37 provided with a handle or hanger 38 at one end, while its other end is provided with a gear 39 engaging the teeth of the rack 33. A spring 39' secured with one end to the upper plate 40 of the body 24 and with its other end to the upper end of the pin 32, tends to normally hold the pin in its elevated position within the channel 31. Near its lower end the body 24 is provided in its interior with a radial slot 41 in alinement with a longitudinal groove 42 in the inner wall of the sleeve 30. A plate 43 is slidably arranged within the slot 41 and engages normally with its outer end flange 44 the groove 42.

On its side face the plate is provided with stops 46 and 47 having inner, beveled edges adapted to be engaged by the beveled face of the lower pointed end 34 of the pin 32 for normally holding the plate with its flange 44 in the groove 42 of the sleeve 30 for locking said sleeve in position on the body 24. It will be clear that when the pin is lowered against the action of spring 39′ by means of the key engaging with its gear the rack of the pin and lowering the same to engage the stops 46 and 47, the plate 43 will be drawn against the action of the spring 45 toward one side to disengage the flange 44 from the groove 42 of the sleeve 30, and the sleeve will be free to rotate upon the body 24, and upwardly so that the forks can be disengaged from the body 24 and the cranks rotated to release the doors.

In order to protect the locking device, the same is arranged within a casing 49 on the car roof 18.

Having thus described my invention, what I claim as new and desire to secure by Letters Patent of the United States is,—

1. A device for locking freight car doors, comprising a locking rod for each door, fingers on said rod for engaging the door, a bar connecting the locking rods of both doors, and means on the roof of a car for locking said locking rod and fingers in their car door locking position and means for unlocking said locking means.

2. A device of the character described for locking the side doors of freight cars, comprising a locking rod for each door, fingers on said rod adapted to be projected through recess in the car wall for engaging the edge of the car door and holding it in closed position, means for connecting the locking rods of both car doors, a crank at the upper end of each locking rod, a socket on said crank, a locking body on said socket, means engaging said body for holding it against rotation, a sleeve on said body engaging said means to lock them in their locking position, means connected with said body for locking said sleeve, and means for releasing said sleeve.

3. In a freight car door locking device, a locking means for opposite doors of a car, comprising two vertical bars provided with fingers adapted to engage both car doors and means for locking said locking means.

4. In a freight car door locking device, a locking means for both doors, a screw-threaded body on top of said locking means, a forked lever for holding said body in adjusted position, a sleeve resting on said forked lever, a spring controlled locking pin in a longitudinal slot of said body, a rack on said pin adapted to be engaged by a key, a sliding locking plate in the lower end of said body normally locking said sleeve to said body, and a spring for disengaging said plate and said sleeve and body from each other upon the operation of said plate by said pin.

5. In a freight car door locking device, means for locking simultaneously both doors of a car, a pair of vertically arranged locking rods, fingers on said rods to grip over the edges of a door to lock the same, a common operating handle for both rods, a crank on each rod, a recessed screw-threaded body on each of said cranks, a forked lever secured to the car roof to move in vertical direction only and gripping into the recesses of said body and means for locking said forked lever against operation.

6. In a freight car door locking device, a body having an outer screw-thread, a longitudinal and two radial grooves, a sleeve adapted to be threaded onto said body and having a longitudinal inner groove, a spring controlled locking pin having a pointed lower end sliding in said longitudinal groove, a rack on said pin, a key provided with a gear engaging said rack and adapted to be introduced through one of the radial grooves of said body, a sliding plate in the other of the radial grooves of said body, a flange on said plate normally engaging the vertical groove in said sleeve for locking the same onto said body, stops on said plate adapted to be engaged and disengaged by the pointed end of said pin upon the operation of said key, and a spring for drawing said plate backward to disengage its flange from the groove of said sleeve.

In testimony whereof I have affixed my signature.

ALIX SWINTI.